United States Patent
Penalba Garcia

(10) Patent No.: US 12,497,238 B2
(45) Date of Patent: Dec. 16, 2025

(54) GUIDED VEHICLE FOR THE TRANSPORT OF PALLETS

(71) Applicant: MECALUX, S.A., Cornella de Llobregat (ES)

(72) Inventor: Francesc Penalba Garcia, Cornella de Llobregat (ES)

(73) Assignee: MECALUX, S.A, Cornella de Llobregat (ES)

( * ) Notice: Subject to any disclaimer, the term of this patent is extended or adjusted under 35 U.S.C. 154(b) by 0 days.

(21) Appl. No.: 18/843,288

(22) PCT Filed: Apr. 24, 2023

(86) PCT No.: PCT/ES2023/070254
§ 371 (c)(1),
(2) Date: Sep. 2, 2024

(87) PCT Pub. No.: WO2023/227808
PCT Pub. Date: Nov. 30, 2023

(65) Prior Publication Data
US 2025/0108974 A1 Apr. 3, 2025

(30) Foreign Application Priority Data
May 24, 2022 (ES) .............. ES202230860U

(51) Int. Cl.
*B65G 1/04* (2006.01)
(52) U.S. Cl.
CPC ......... *B65G 1/0471* (2013.01); *B65G 1/0492* (2013.01); *B65G 2201/0267* (2013.01)
(58) Field of Classification Search
CPC .... B65G 1/0471; B65G 1/0492; B65G 1/065; B65G 2201/0267
(Continued)

(56) References Cited

U.S. PATENT DOCUMENTS 5,370,492 A * 12/1994 Gleyze ................ B65G 1/0492
414/284
10,351,344 B2 7/2019 Gebhardt
(Continued)

FOREIGN PATENT DOCUMENTS

CN 108584324 A * 9/2018 ........... B65G 1/0492
CN 108910382 A 11/2018
(Continued)

OTHER PUBLICATIONS

International Search Report for related patent application PCT/ES2023/070254 prepared by the European Patent Office and dated Sep. 8, 2023, English translation provided.
(Continued)

*Primary Examiner* — James Keenan
(74) *Attorney, Agent, or Firm* — Thedford I. Hitaffer; Hitaffer & Hitaffer, PLLC

(57) ABSTRACT

A guided vehicle for transporting pallets moves through a rack structure in a first direction and in a second direction that is perpendicular to the first direction. The guided vehicle includes a frame provided with a first set of wheels provided for moving the frame in the first direction, and a second set of wheels provided to move the frame in the second direction, and a loading platform. In addition, an assembly configured to lift the loading platform is provided, controlled by a control unit, the upwards and downwards movement of the loading platform being linkable to the upwards and downwards movement of the first plurality of wheels. The assembly includes a cam system actuated by motor means, the cam system being provided with a set of cams in such a way that the spatial position of the cams defines three operating positions.

18 Claims, 13 Drawing Sheets

(58) Field of Classification Search
USPC .......................................................... 414/286
See application file for complete search history.

(56) References Cited

U.S. PATENT DOCUMENTS

| | | |
|---|---|---|
| 10,486,902 B2 | 11/2019 | Itoh |
| 12,091,248 B2 * | 9/2024 | Pretorius .............. B65G 1/0492 |

FOREIGN PATENT DOCUMENTS

| | | | | |
|---|---|---|---|---|
| CN | 111591659 A | | 8/2020 | |
| CN | 111846731 A | * | 10/2020 | ........... B65G 1/0492 |
| EP | 3670390 A1 | | 6/2020 | |
| JP | 2018115071 A | | 7/2018 | |

OTHER PUBLICATIONS

Written Opinion by the International Searching Authority for related patent application PCT/ES2023/070254 prepared by the European Patent Office and dated Sep. 8, 2023, English version provided.

* cited by examiner

GUIDED VEHICLE FOR THE TRANSPORT OF PALLETS

CROSS-REFERENCE TO RELATED APPLICATIONS

This application is a national stage application under 35 U.S.C. § 371 of PCT patent application PCT/ES2023/070254 filed on 24 Apr. 2023, which is pending and which is hereby incorporated by reference in its entirety for all purposes. PCT patent application PCT/ES2023/070254 claims priority to Spanish patent application ES U202230860 filed 24 May 2022, which is hereby incorporated by reference in its entirety for all purposes.

BACKGROUND OF THE INVENTION

1. Field of the Invention

The invention is directed to a guided vehicle for transporting pallets.

More specifically, the invention is directed to a guided vehicle for transporting pallets which is provided with a mechanism that can simultaneously actuate the rolling means and the lifting platform for loading the pallets.

2. Discussion of the Related Art

In large rack structures intended for the storage of products with pallets, a shuttle is used that linearly moves on main rails, i.e., it only moves in one linear direction. To access the aisles located on both sides of the main rails, which have a perpendicular direction, the shuttle incorporates a runner intended to move through the side channels, i.e., in a direction perpendicular to the direction of movement of the shuttle, so that it is responsible for collecting and placing the pallets on the corresponding shelf. Although this arrangement satisfactorily fulfils the main purpose thereof, it implies the use of a complex shuttle with a higher manufacturing cost. Moreover, the described system may reduce the number of operations performed over time, since it does not allow for the simultaneous operation of several shuttles, given the limitations of movement when moving only in one direction.

Furthermore, shuttles provided with platforms with wheels for movement and/or guidance along the profiles present on the rails or aisles are known, wherein the wheels can move upwards and/or downwards by means of an actuator mechanism, provided specifically to perform this movement, while a second actuator mechanism is used to move the platform. This arrangement implies a greater number of components, which increases the complexity of the shuttle, raising the associated manufacturing and/or maintenance costs, and thus there is a need to improve this type of transport equipment.

Furthermore, the applicant is currently unaware of any invention that has all of the features described in this specification.

SUMMARY OF THE INVENTION

The present invention has been developed with the aim of providing a guided vehicle that is configured as a novelty within the field of application and solves the previously mentioned drawbacks, further contributing other additional advantages that will be obvious from the description below.

It is therefore an object of the present invention to provide a guided vehicle for transporting pallets, intended to be moved along a rack structure provided with movement rails to be movable in a first direction and in a second direction that is perpendicular to the first direction, of the type comprising a frame provided with a first plurality of wheels provided for moving the frame in the first direction and a second plurality of wheels provided for moving the frame in the second direction, a loading platform configured to support the pallets which is able to be axially elevated perpendicular to the horizontal plane, wherein driving means are provided, configured to lift the loading platform, controlled by a control unit mounted on the frame, the upwards and downwards movement of the platform able to be linked to the upwards and downwards movement of the first plurality of wheels. In particular, the invention is characterised in that the driving means comprise a cam system actuated by motor means, the cam system being provided with a plurality of cams such that the movement of the cam is linked to the upwards and downwards movement of the platform, the upwards and downwards movement of the first plurality of wheels and the upwards and downwards movement of the second plurality of wheels, such that the spatial position of the cams defines three operating positions.

These features simplify the productive and operating process of the vehicle, since by means of a single mechanism it is possible to obtain different operating positions, thereby reducing the number of components required and, therefore, manufacturing costs. In addition, this fact advantageously allows for the use of a single vehicle for loading/unloading and transport operations, instead of using a shuttle equipped with an additional vehicle, which significantly increases manufacturing costs, as well as maintenance costs, by having to maintain two movable vehicles.

In a preferred embodiment, the cam system comprises two cam assemblies, each provided with an actuator rod movable upwards and downwards associated with the first plurality of wheels, two cams spaced apart from each other that act synchronously by means of a chain gear mechanism, and wherein each of the actuator rods has a contact surface provided to make contact with the cam in at least one operating position.

According to the invention, the gear mechanism for each set can comprise gearwheels solidly coupled to a corresponding cam, such that the movement of the gearwheels is transmitted by an endless chain and at least a drive pinion associated with a drive shaft.

Advantageously, the endless chain comprises a pair of end regions provided with a plurality of links coupled to one another and a central region provided with a tensioning means, so as to extend the useful life of the endless chain, given that it reduces the deformations thereof.

Additionally, the guided vehicle of the invention can comprise elastic return means that are linked to the two actuator rods and the frame.

Additionally, position sensor means are provided connected to the control unit, which are configured to detect the position of the cams in space.

Preferably, the aforementioned sensor means comprise three fixed probes in fixed positions and a projection in a movable part of the gear assembly, such that, in any of their positions in space corresponding to the operating positions of the cams, the projection is aligned with one of the three probes, thus detecting the corresponding operating position.

According to the invention, the first plurality of wheels comprises wheels that are located in two housings movable along the vertical axis, arranged on opposite sides of the frame, the wheels being detachably mounted on fixed shafts in the housings, each end of the actuator rods being solidly joined to a respective housing, in such a way that the actuator rods and the housings can move together.

Additionally, guide means are provided for the axial upwards and downwards movement of the housings, and retractable guide means linked to the first plurality of wheels can also be included.

Preferably, the retractable guide means comprise a plurality of idler cylinders located in the corners of the frame, the cylinders being able to move upwards and downwards by means of an actuator mechanism that is linked to the housing of the first plurality of wheels, such that in an extended condition, the idler cylinders extend beyond the plane defined by the lowest point of the wheels that form part of the second plurality of wheels, while in a retracted condition, the lowest end of the cylinders is located above the plane defined by the lowest point of the wheels.

Thus, the guided vehicle described represents an innovative structure with structural and constituent features heretofore unknown for its intended purpose, reasons which, taken together with its usefulness, provide it with sufficient grounds for obtaining the requested exclusivity privilege.

Other features and advantages of the guided vehicle object of the present invention will become apparent from the description of a preferred but not exclusive embodiment illustrated by way of non-limiting example in the attached drawings, in which:

BRIEF DESCRIPTION OF THE INVENTION

DESCRIPTION OF A PREFERRED EMBODIMENT

In view of the aforementioned figures, and in accordance with the adopted numbering, one may observe therein a preferred exemplary embodiment of the invention, which comprises the parts and elements indicated and described in detail below.

Moreover, the terms first, second, third, and the like in the description and in the claims are used to distinguish between similar elements and not necessarily to describe a sequential or chronological order. The terms may be interchanged under appropriate circumstances and the embodiments of the invention may operate in sequences other than those described or illustrated herein.

Moreover, the terms upper, lower, up, down, and the like in the description and in the claims are used for descriptive purposes and not necessarily to describe relative positions.

Figure 1:
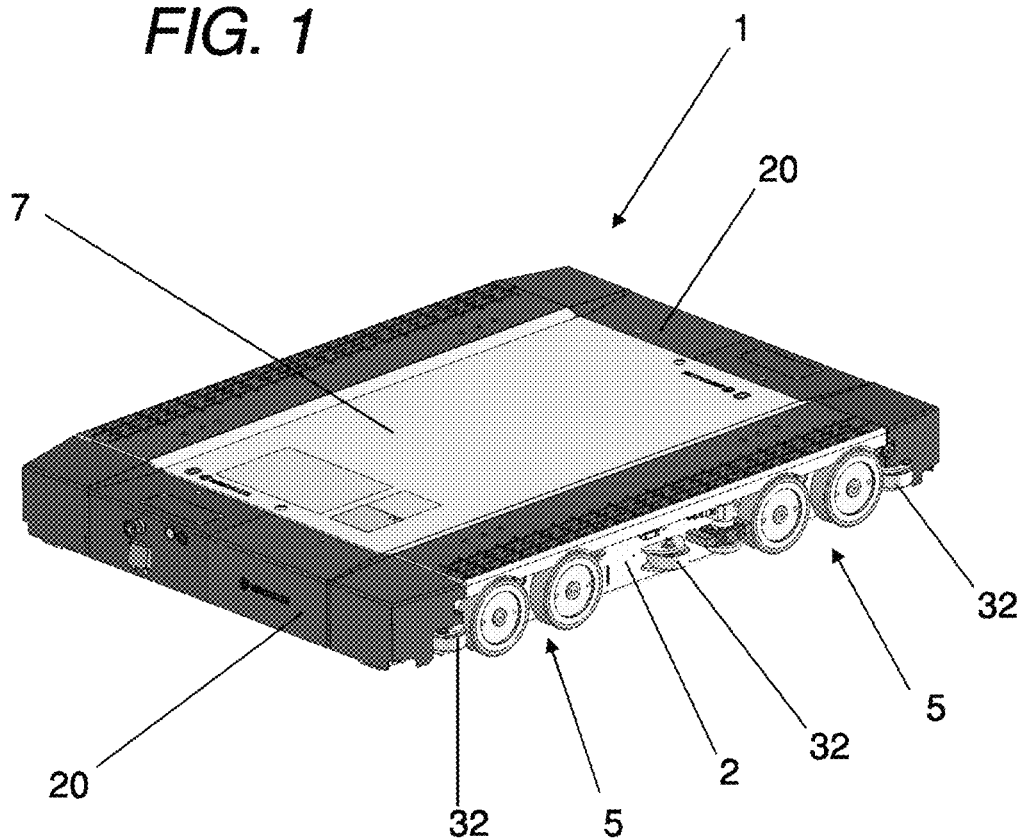
FIG. 1 is a perspective view of an embodiment of the vehicle according to the present invention.
Figure 2:
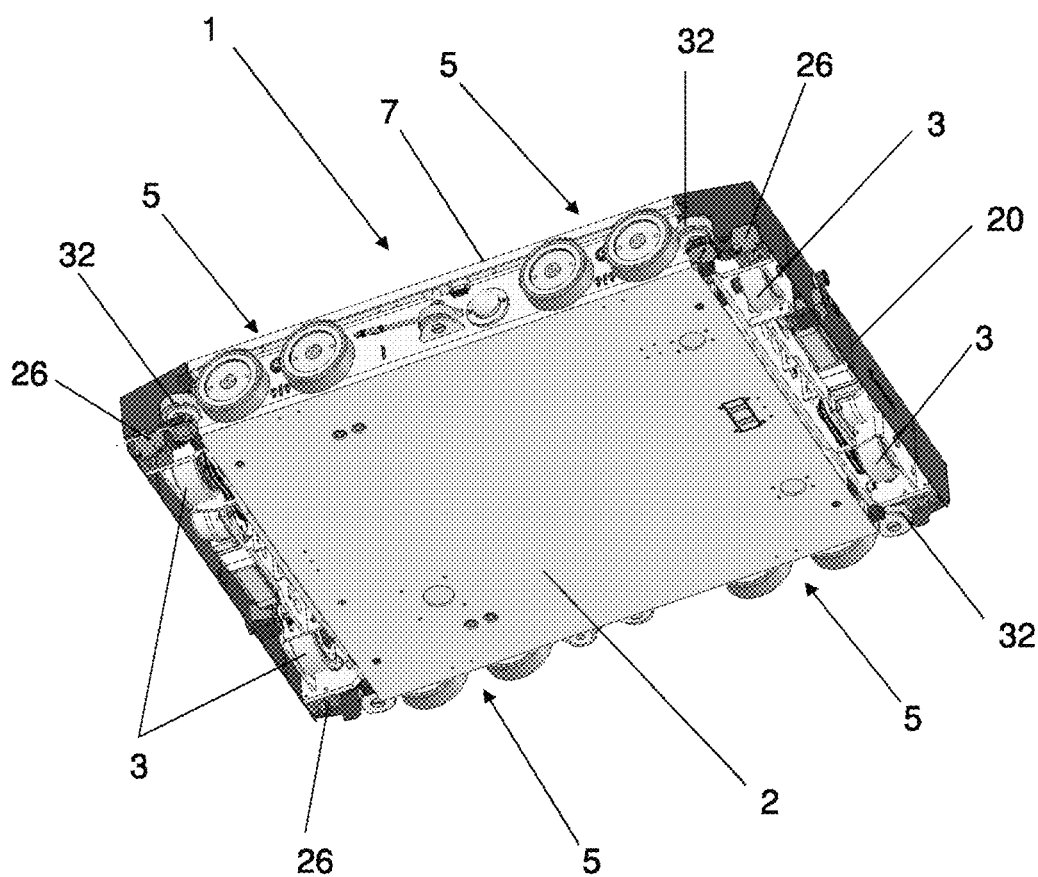
FIG. 2 is a lower perspective view of the vehicle according to the invention.
Figure 3:
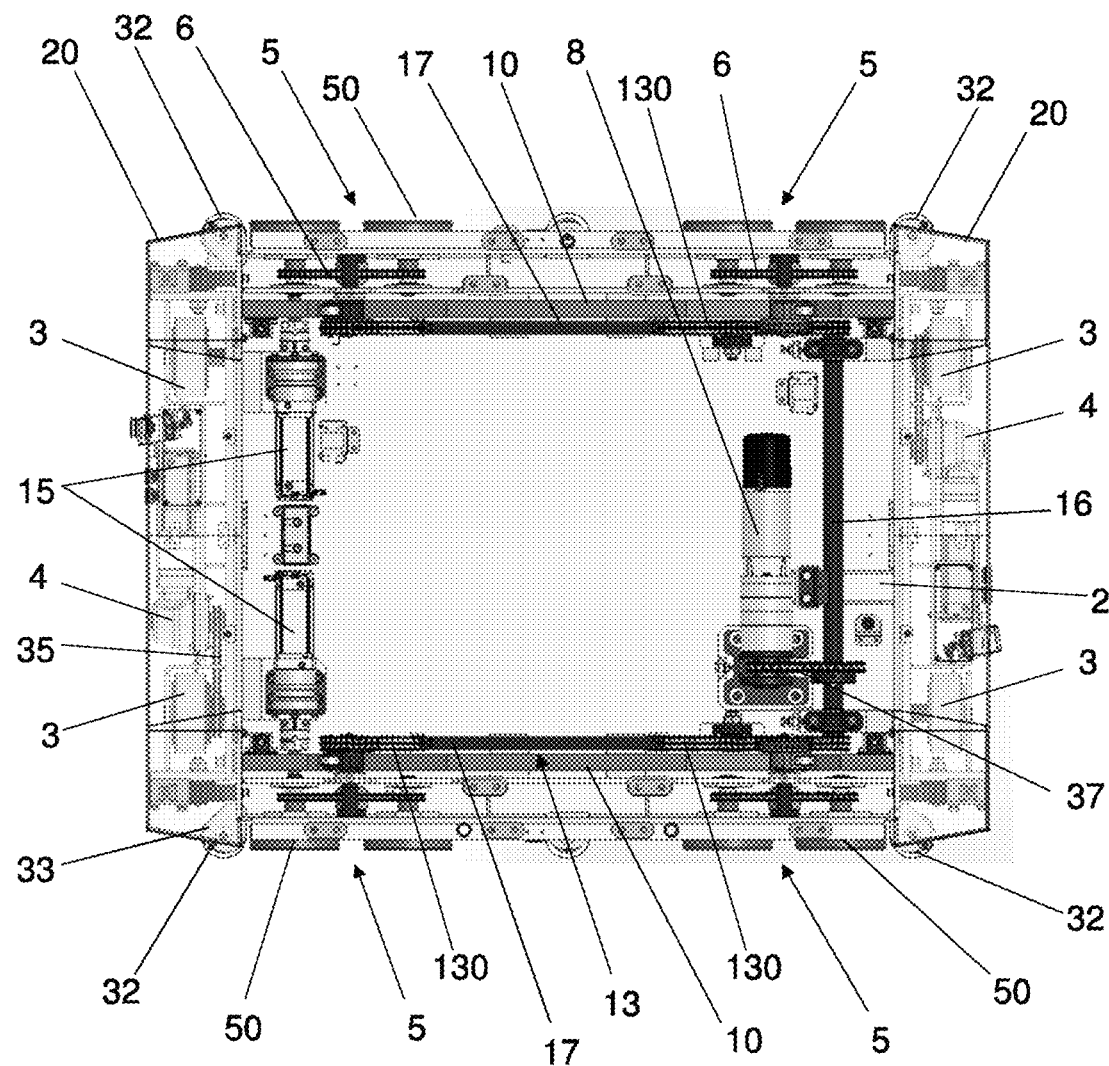
FIG. 3 is an upper plan view of the vehicle shown in FIGS. 1 and 2.

FIGS. 1 to 3 show an embodiment of the guided vehicle, generally indicated with the reference (1), for transporting pallets, intended to be moved along a conventional rack structure (not shown), which is provided with movement rails to be movable in a first direction and in a second direction that is perpendicular to the first direction. Thus, the guided vehicle operates on the three spatial axes (x,y,z).

The vehicle (1) comprises a box-shaped frame (2) provided with a first plurality of wheels arranged in such a way to allow for the movement of the frame (2) in the first direction, having two wheels (3) separated from one another located on each of two opposite sides. On each of the sides, one of the wheels (3) is a drive wheel that is linked to an electric motor (4) by a chain gear system (35), both electric motors (4) working synchronously, so that both drive wheels rotate at the same speed.

The frame (2) also includes a second plurality of wheels provided for the movement of the frame in the second direction which has four wheel trains (5), each formed by two wheels (50) linked together by a gear chain (6), with two wheel trains (5) located on opposite sides to one another. Two wheel trains (5) are coupled to respective electric motors (15) (see FIG. 3) which act synchronously with one another.

Thus, the first plurality of wheels is on an axis perpendicular to the second plurality of wheels described above.

A loading platform (7) is provided at the upper portion of the frame (2) configured to lift the pallets resting on the rack structure. The pallet can be axially and vertically lifted perpendicular to the horizontal plane, wherein driving means (described in greater detail below) are provided, configured for lifting the loading platform (7), controlled by a control unit mounted on the frame (2), the upwards and downwards movement of the loading platform (7) being linkable to the upwards and downwards movement of the wheels (3).

In particular reference to the driving means, the same comprise a cam system actuated by a servomotor (8) connected to the control unit, the cam system being provided with a plurality of cams (9) (in this embodiment there are four cams), in such a way that the movement of the cam is linked to the upwards and downwards movement of the loading platform (7), the upwards and downwards movement of the first plurality of wheels and the upwards and downwards movement of the second plurality of wheels, such that the spatial position of the cams (9) defines three operating positions.

Figure 4A:
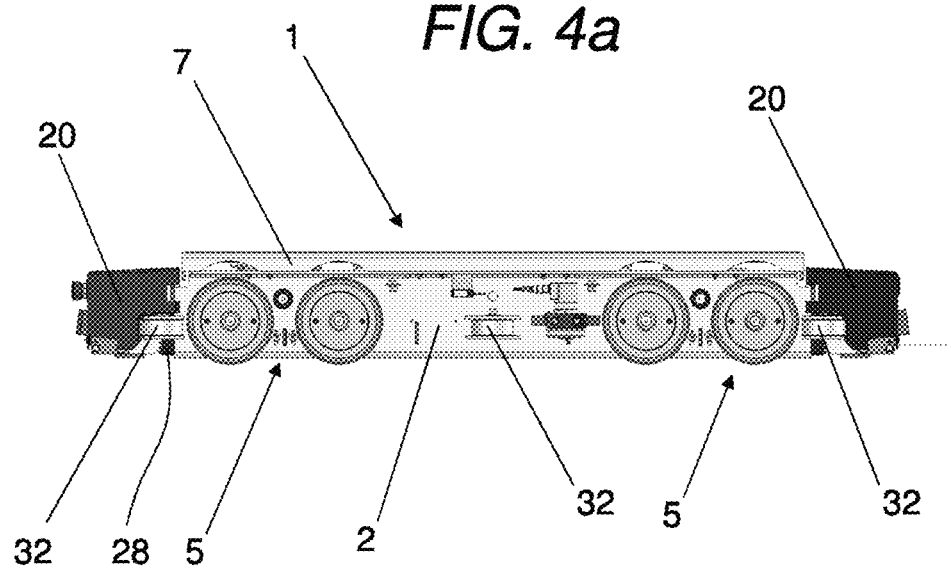
FIGS. 4a and 4b are elevation views of the vehicle of the invention in a first operating position with the second plurality of wheels in operation, with the platform at the highest position thereof, wherein some parts have been omitted for illustrative purposes.
Figure 4B:
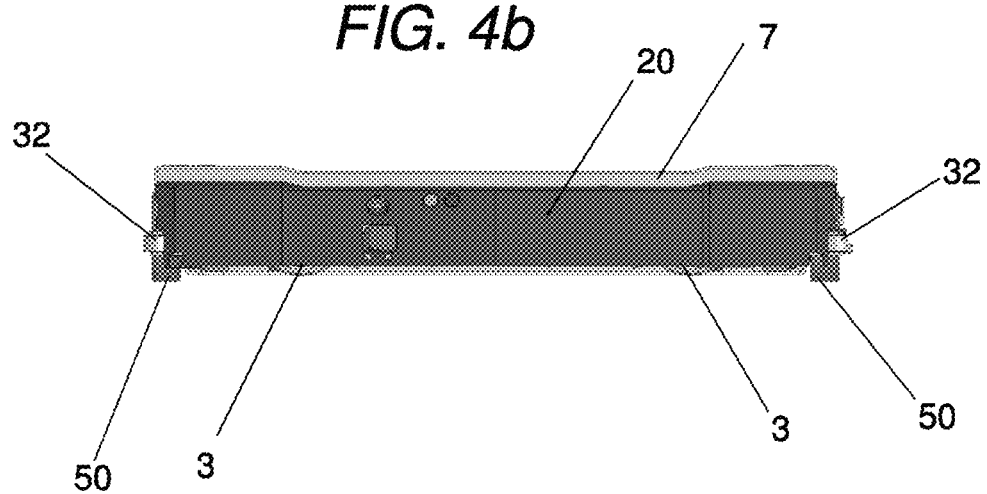
Figure 6A:
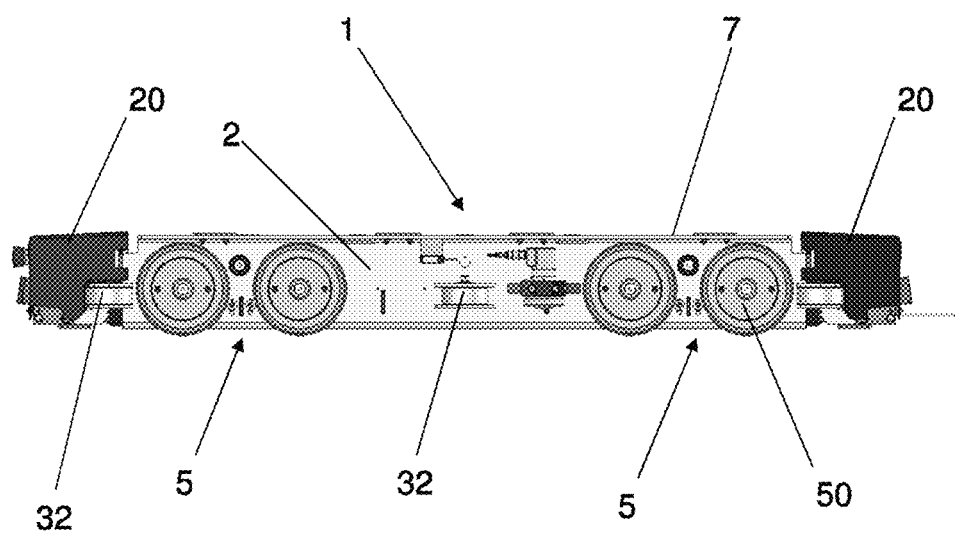
FIGS. 6a and 6b are elevation views of the vehicle of the invention in a second operating position with the platform lowered and the second plurality of wheels in operation, wherein some parts have been omitted for illustrative purposes.
Figure 6B:
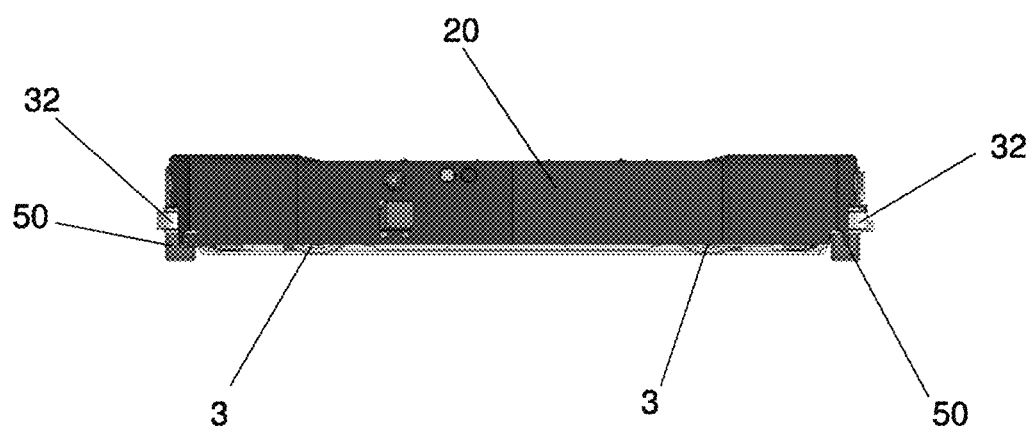
Figure 8A:
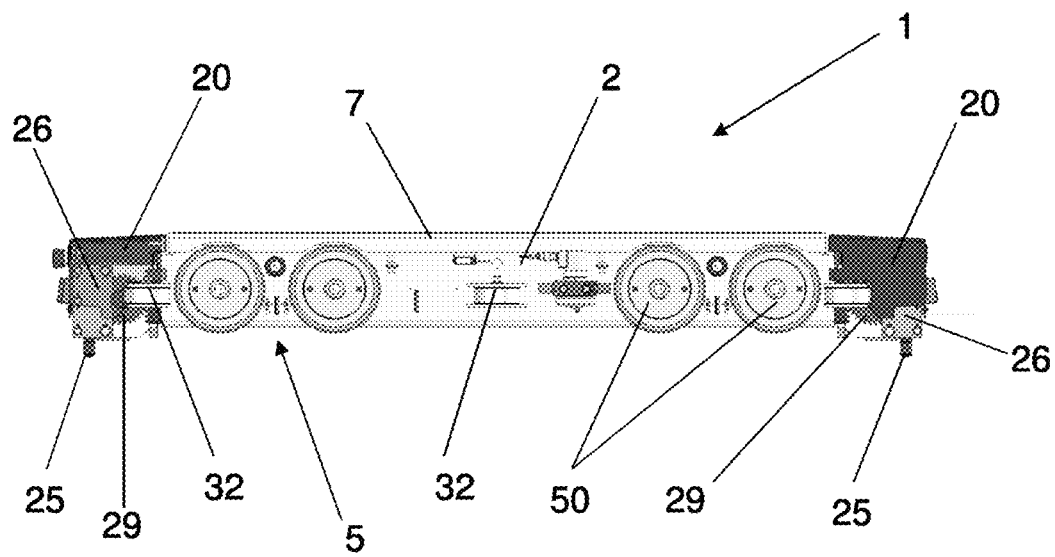
FIGS. 8a and 8b are elevation views of the vehicle of the invention in a third operating position, with the first plurality of wheels in operation, wherein some parts have been omitted for illustrative purposes.
Figure 8B:
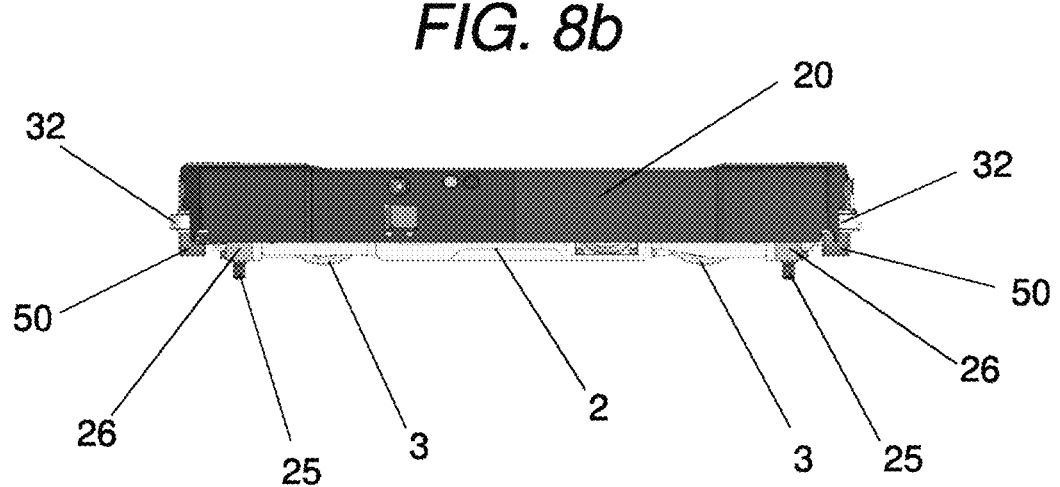

These three previous operating positions correspond to a first position (FIGS. 8a-8b) in which the vehicle moves along a main aisle and the loading platform (7) is at the lowest position thereof; a second position (FIGS. 6a-6b) in which the vehicle moves along a side channel and the loading platform (7) is at the lowest position thereof; and a third position (FIGS. 4a-4b) in which the loading platform (7) is lifted for loading a pallet (not shown).

The cam system comprises two cam assemblies located on the sides of the frame (2), each of which being provided with an actuator rod (10) movable upwards and downwards associated with the first plurality of wheels, two cams (9) spaced apart from one another operating synchronously by means of a chain gear mechanism, and wherein each of the actuator rods (10) has a pair of contact surfaces (11) intended to make contact with a respective cam (9) in an operating position. Each of the actuator rods (10) is made up of an elongated profile located inside the frame that covers a large portion of the length of the side on which it is arranged, the contact surfaces (11) being defined by recessed portions.

Figure 5:
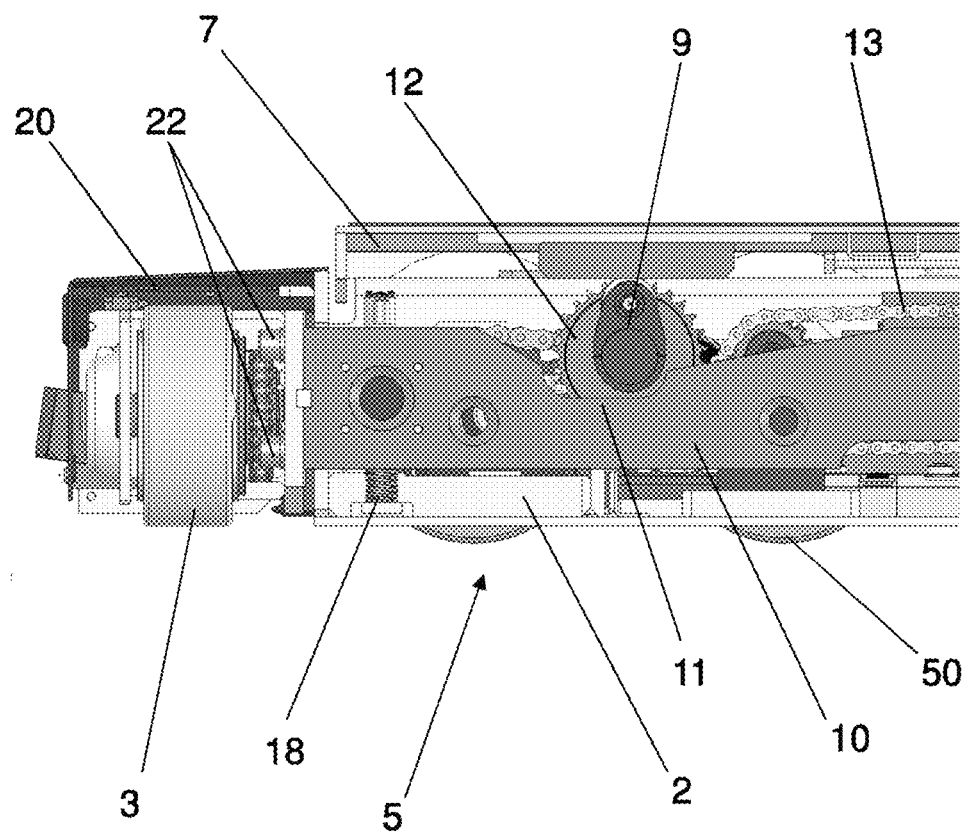
FIG. 5 is a partial elevation view of the driving means in the first operating position.
Figure 7:
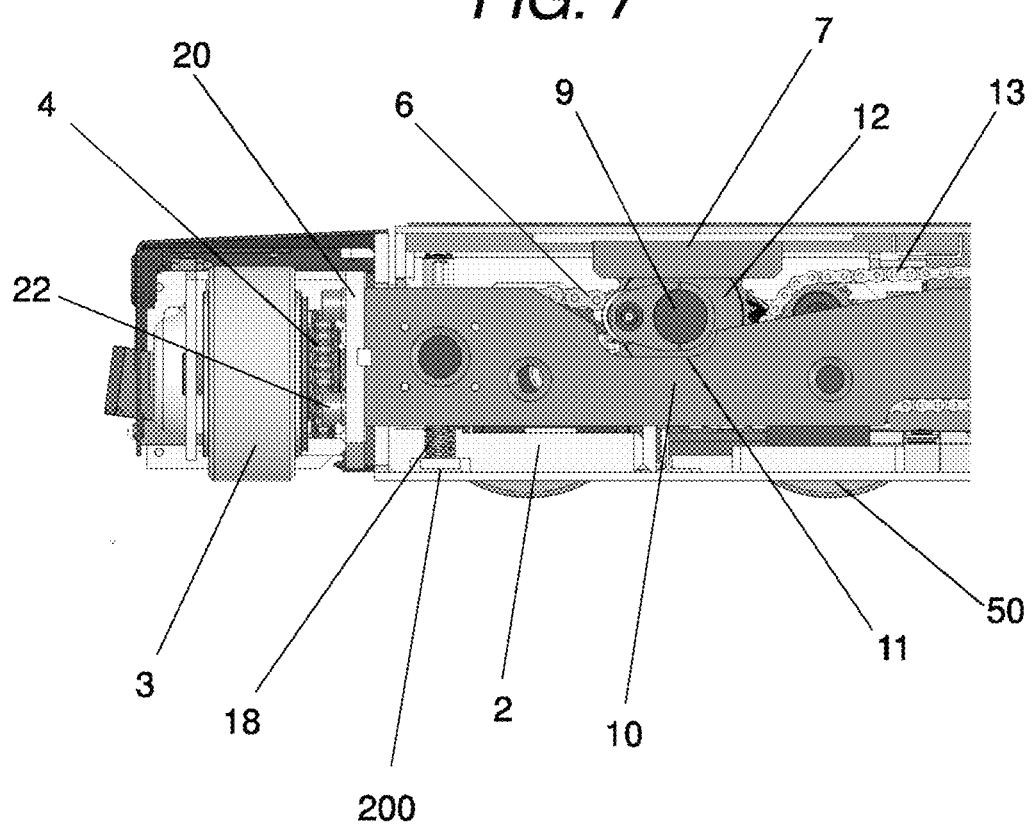
FIG. 7 is a partial elevation view of the driving means in the second operating position.
Figure 9:
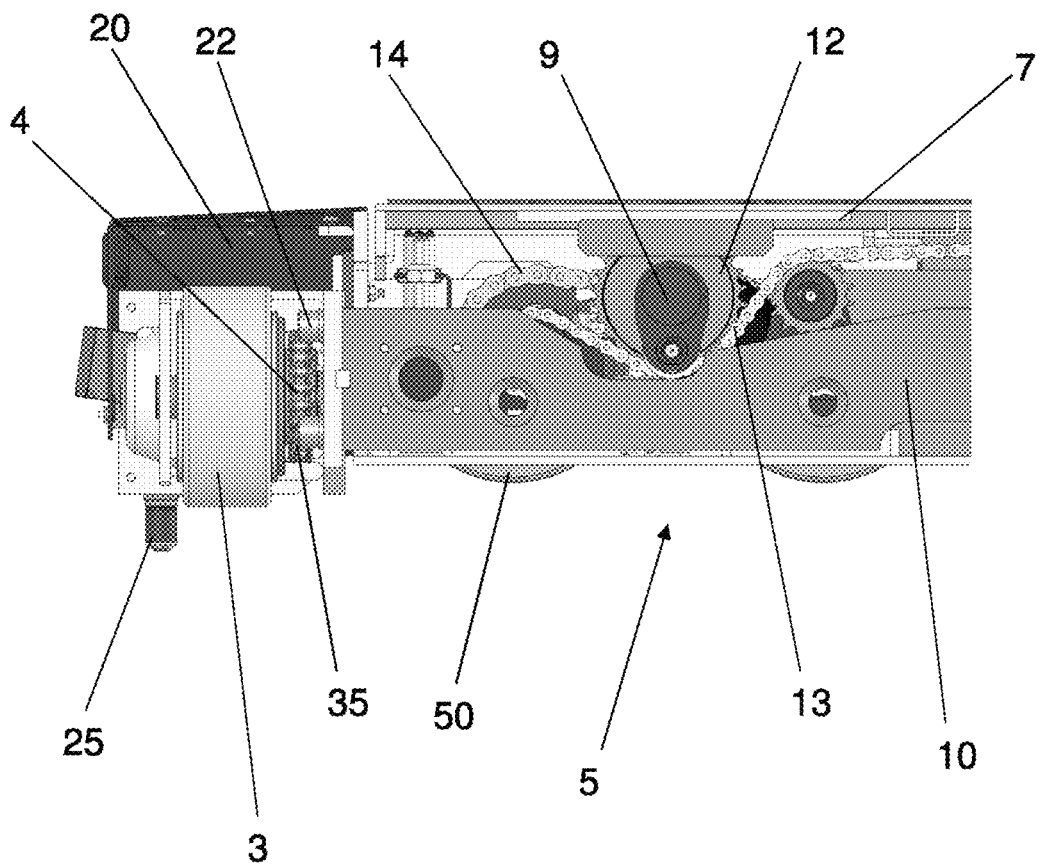
FIG. 9 is a partial elevation view of the driving means in the third operating position.
Figure 10:
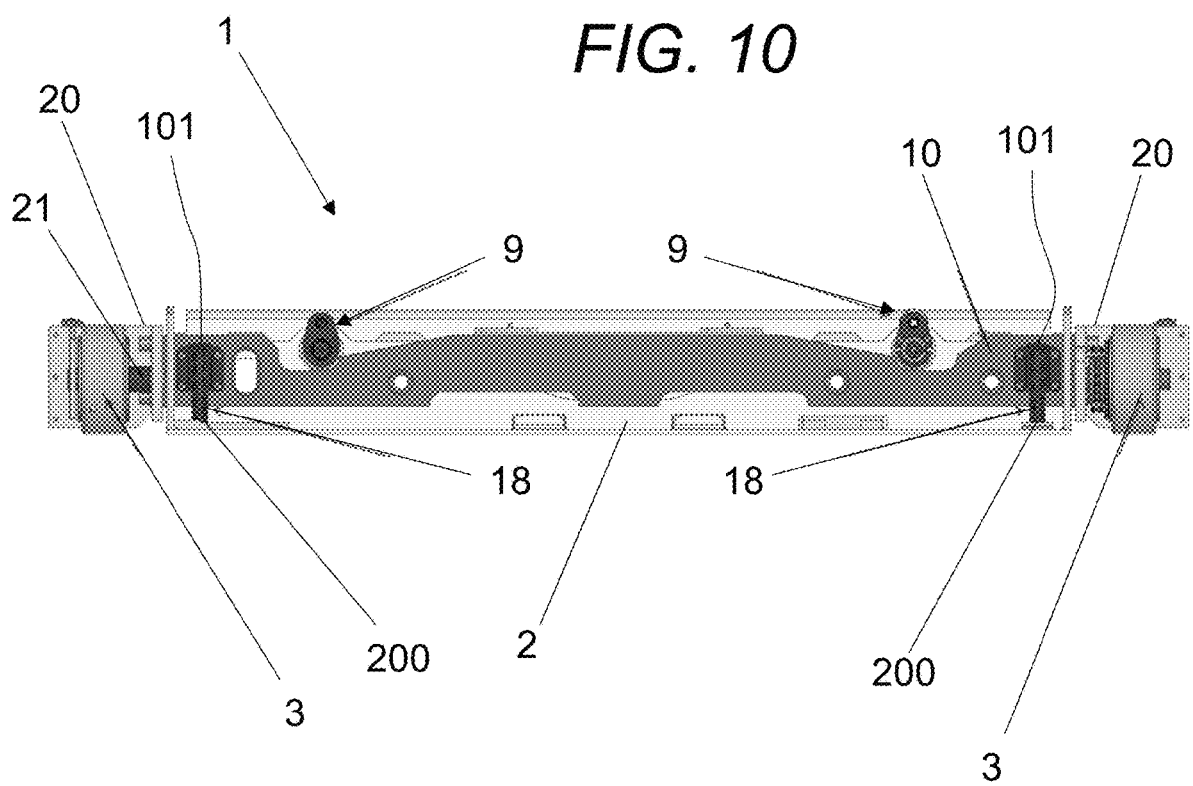
FIG. 10 is a side elevation view of the vehicle, wherein some parts have been omitted.

With regards to the gear mechanism, each cam assembly comprises a gearwheel (12) rotatably fixed to the frame and solidly coupled on a parallel plane to a corresponding cam (9), in such a way that the movement of the gearwheels (12) is transmitted by an endless chain (13) and at least one drive pinion (14) associated with a spindle (16) linked to the servomotor (8), as can be seen in FIGS. 5, 7, and 9.

The spindle (16) allows the synchronised movement to be transmitted to the two cam assemblies in a compact and efficient manner, the transmission between the servomotor (8) and the spindle (16) being carried out by means of a transmission chain (37) (see FIG. 3).

It is noteworthy to mention that the endless chain (13) carries out a reciprocating motion and comprises a pair of end regions (130) provided with a plurality of links coupled to one another, and a central region provided with a tensioning element (17) made of an elastomeric material.

In addition, the driving means include elastic return or recovery means that are linked to the two actuator rods (10) and the frame (2). More specifically, said return means comprise a plurality of helical springs (18) mounted on vertical shafts located at end areas of each of the actuator rods (10), wherein the upper end abuts against a stop segment (101) fixed to the actuator rod (10) while the lower end of the helical spring (18) abuts against a stop surface (200) in the lower portion of the frame (2).

Additionally, to ensure the correct operation of the vehicle in the different operating positions, position sensor means are provided connected to the control unit, which are configured to detect the position of the cams in space, so that the control unit is aware at all times of the operative position. These sensor means comprise three fixed probes in fixed positions and a projection in a movable part of the gear assembly, such that, in any of their positions in space corresponding to the operating positions of the cams, the projection is aligned with one of the three probes, thus detecting the corresponding operating position.

Once again in reference to the first plurality of wheels, said wheels (3) are located in two movable housings (20) arranged on opposite sides and on the outer portion of the frame (2), the wheels being mounted on rotation shafts (21) which are detachably fixed to the movable housings (20). These housings (20) are formed by drawers defined by four side walls in such a way that they are superiorly and inferiorly open. Each end of the actuator rods (10) is solidly joined to a movable housing (20), by the arrangement of bolts (22), such that they guarantee that the actuator rods (10) and the movable housings (20) move together and simultaneously in an upwards or downwards direction, depending on the operating position at each moment.

To ensure an axial movement without undesirable deviations, guide means are also provided for the axial movement in an upwards and downwards direction of the movable housings with respect to the frame. These guide means comprise linear grooves (23) in vertical walls of the frame (2) facing one another, on which a corresponding rail (24) externally fixed to a side wall of the movable housing (20) is able to slide.

In order to ensure that unwanted side movements do not occur which could cause the frame (2) to rub against the guide rails of a storage facility, retractable guide means linked to the first plurality of wheels are arranged, which will be explained below and which are shown in detail in FIGS. 11 and 12.

Said retractable guide means comprise a plurality of idler cylinders (25) housed in boxes (26) situated at the corners of the frame, the idler cylinders (25) being movable upwards and downwards by means of an actuating mechanism which is linked to the housing of the first plurality of wheels, such that in an extended condition (FIG. 12), the idler cylinders (25) extend beyond the plane defined by the lowest point of the wheels that form part of the second plurality of wheels through an outlet hole (27) present on the lower portion of each box (26). Whereas in a retracted condition (FIG. 11), the lowest end of the idler cylinders (25) is located above the plane defined by the lowest point of the wheels.

Figure 11:
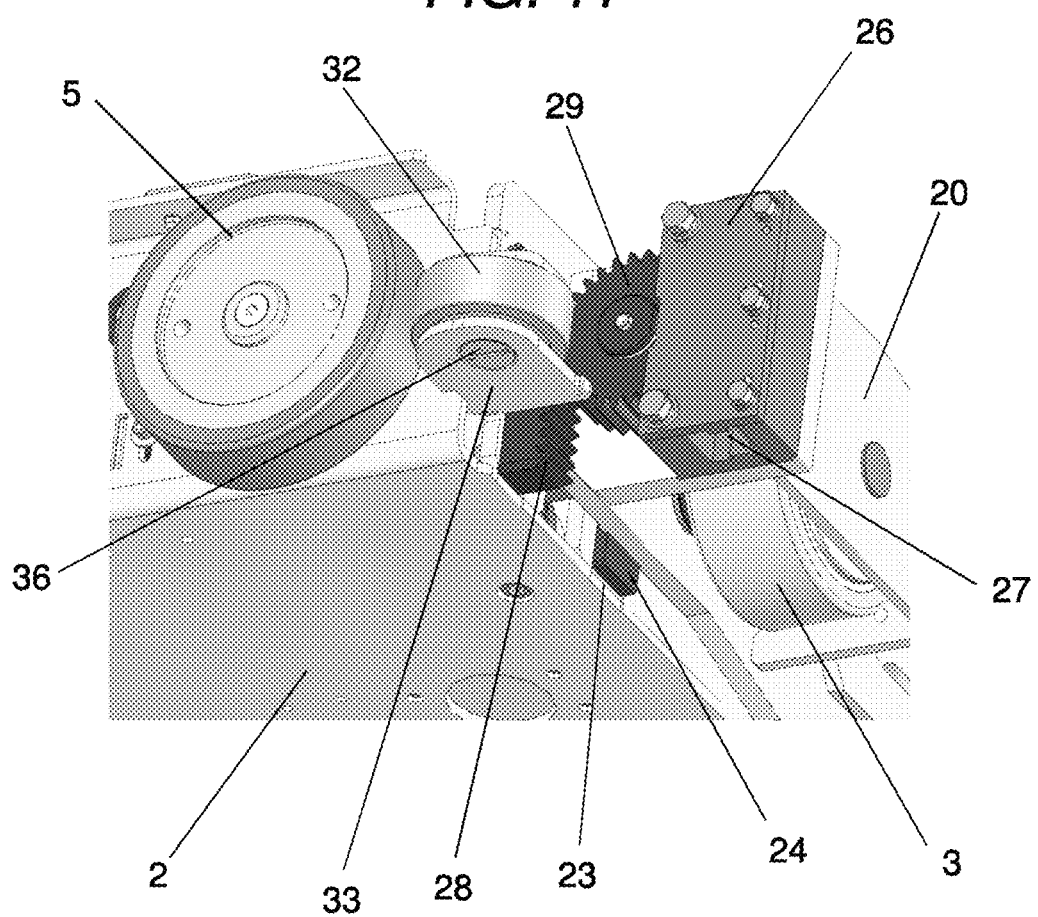
FIG. 11 is a perspective detailed view of the area where retractable guide means are located linked to the first plurality of wheels in a retracted position.
Figure 12:
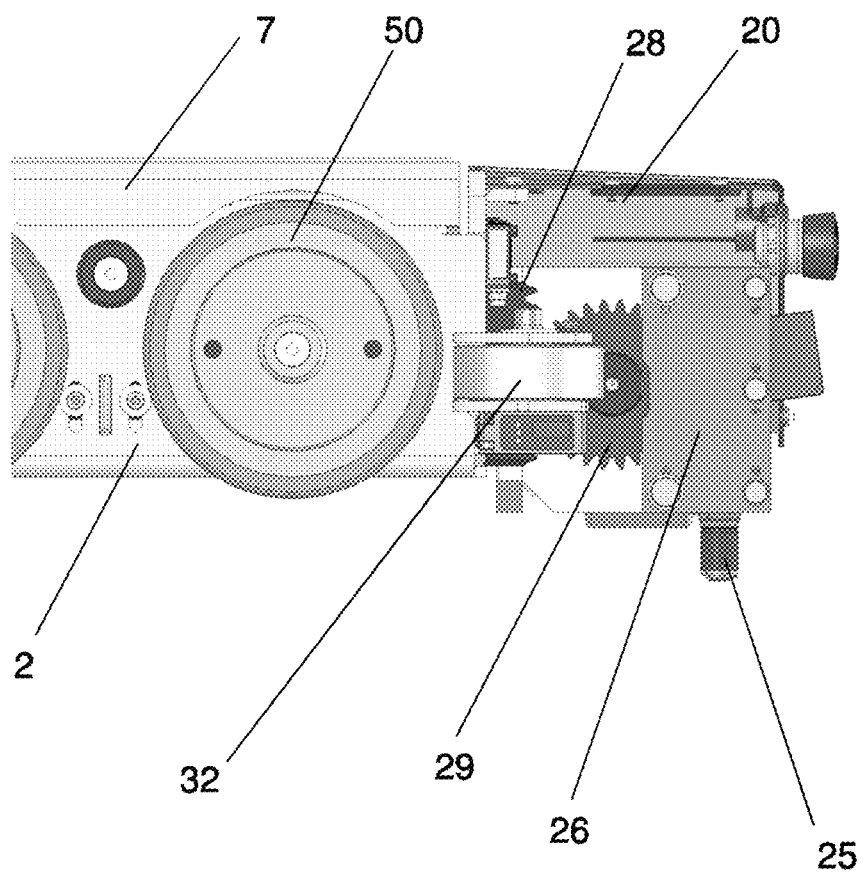
FIG. 12 is a detailed elevation view of the retractable guide means shown in FIG. 11 in an extended position.

As can be seen more clearly in FIGS. 11 and 12, the actuating mechanism comprises a vertically arranged rack (28) fixed to a side wall of the frame (2), wherein a gearwheel (29) is coupled in the housing which transmits its rotational movement to a linear movement of the idler cylinder (25) through a toothed region associated with the idler cylinder (25).

Figure 13:
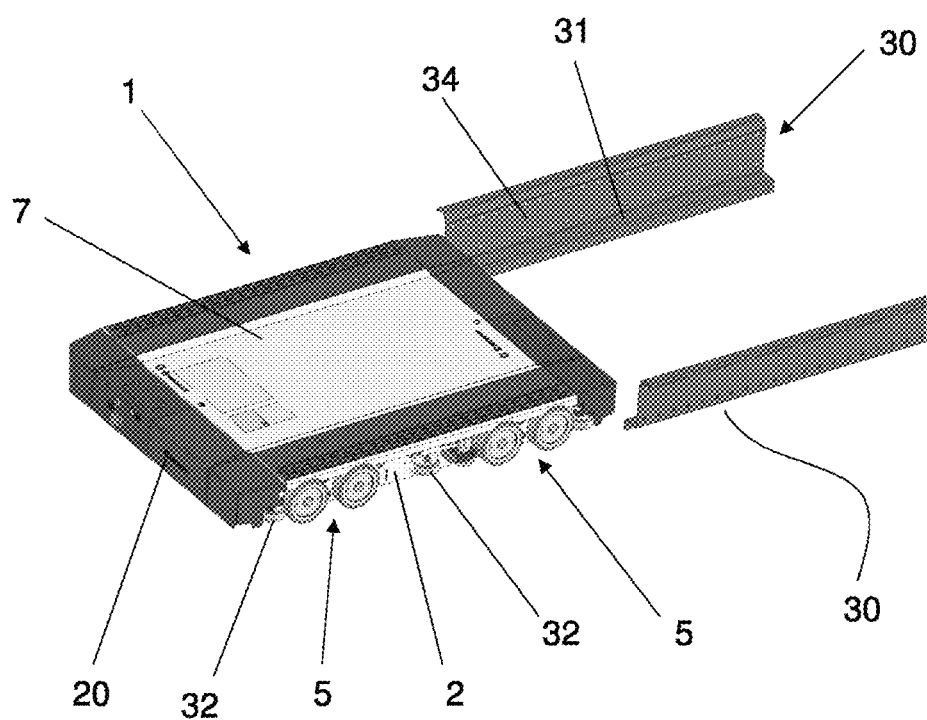
FIG. 13 is an exploded perspective view of the guided transport vehicle according to the invention and with a guide rail or channel along which the guided vehicle is able to slide.

Also, guide wheels (32) are provided for guidance without presence of unwanted side movements of the frame (2) along the rails (30) formed by two separate and parallel profiles (see FIG. 13), when the vehicle moves by the movement of the wheel trains (5) by coming into contact with the horizontal rolling surface (31) of the rails. These guide wheels (32) are coupled by means of a shaft (36) mounted on a prolongation (33) that projects from the side wall of the frame (2) provided to make contact with a vertical segment (34) of the rail (30). These guide wheels (32) are located on the two facing sides where the wheel trains (5) are located.

The details, shapes, dimensions and other accessory elements, used to manufacture the guided vehicle of the invention, may be suitably substituted for others which do not depart from the scope defined by the claims which are included below.

The invention claimed is:
1. A guided vehicle for transporting pallets, intended to be moved along a rack structure provided with movement rails to be movable in a first direction and in a second direction that is perpendicular to the first direction, the guided vehicle comprising:
a frame provided with a first plurality of wheels provided for the movement of the frame in the first direction and a second plurality of wheels provided for the movement of the frame in the second direction, a loading platform configured to support the pallets which is able to be axially lifted perpendicular to a horizontal plane, wherein driving means configured for elevating the loading platform are provided, upwards and downwards movement of the loading platform being linked to upwards and downwards movement of the first plurality of wheels, wherein the driving means comprise a cam system actuated by motor means, the cam system being provided with a plurality of cams in such a way that the movement of the cams is linked to the upwards and downwards movement of the loading platform, the upwards and downwards movement of the first plurality of wheels and upwards and downwards movement of the second plurality of wheels, such that a spatial position of the cams defines three operating positions, wherein the cam system comprises two cam assemblies, each provided with an actuator rod configured to be moved upwards and downwards associated with the first plurality of wheels and two cams of the plurality of cams spaced apart from each other that act synchronously by means of a chain gear mechanism, and wherein each of the actuator rods has a contact surface provided to be in contact with a respective one of the cams in at least one of the operating positions.

2. The guided vehicle according to claim 1, wherein the gear mechanism for each cam assembly comprises gearwheels solidly coupled to a corresponding cam of each of the cam assemblies, in such a way that the movement of the gearwheels is transmitted by an endless chain, and at least one drive pinion associated with a drive shaft.

3. The guided vehicle according to claim 2, wherein the endless chain comprises a pair of end regions provided with a plurality of links coupled to one another and a central region provided with a tensioning means.

4. The guided vehicle according to claim 1, further comprising elastic return means that are connected to the two actuator rods and the frame.

5. The guided vehicle according to claim 4,
wherein the return means comprise a plurality of helical springs located in end areas of each of the actuating rods,
wherein an upper end of a respective helical spring of the plurality of helical springs abuts against a portion of a respective one of the actuator rods while a lower end of the respective helical spring abuts against an abutment surface present in a lower portion of the frame.

6. The guided vehicle according to claim 1, wherein the first plurality of wheels comprises wheels that are located in two movable housings arranged on opposite sides of the frame, the wheels being detachably mounted on fixed shafts, each end of the actuator rods being solidly connected to one housing of the two movable housings, in such a way that the actuator rods and the housings are moveable together.

7. The guided vehicle according to claim 6, wherein a guide means is provided for the axial movement of the housings in an upwards and downwards direction.

8. The guided vehicle according to claim 7, wherein the guide means comprise linear grooves present in vertical walls of the frame facing one another on which a corresponding rail is able to slide.

9. The guided vehicle according to claim 1, further comprising retractable guide means linked to the first plurality of wheels.

10. A guided vehicle for transporting pallets along a rack structure comprising rails for movement of the guided vehicle in a first direction and in a second direction perpendicular to the first direction, the guided vehicle comprising:

a frame, a first plurality of wheels configured to support the frame for movement in the first direction and a second plurality of wheels configured to support the frame for movement in the second direction, a loading platform configured to support the pallets, and driving means configured to move the loading platform upwards and downwards, the upwards and downwards movement of the loading platform being linked to upwards and downwards movement of the first plurality of wheels, the driving means comprising a cam system actuated by a motor, the cam system comprising a plurality of cams configured for movement linked to the upwards and downwards movement of the loading platform, the upwards and downwards movement of the first plurality of wheels and upwards and downwards movement of the second plurality of wheels, whereby a spatial position of the plurality of cams defines three operating positions, the cam system comprising two cam assemblies, each provided with an actuator rod configured to be moved upwards and downwards with the first plurality of wheels and two cams of the plurality of cams spaced apart from each other that operate synchronously by a chain gear mechanism, and the actuator rods each comprising a contact surface configured to contact a respective one of the cams in at least one of the operating positions.

11. The guided vehicle according to claim 10, wherein the gear mechanism for each cam assembly comprises gearwheels solidly coupled to a corresponding cam of each of the cam assemblies, in such a way that the movement of the gearwheels is transmitted by an endless chain, and at least one drive pinion associated with a drive shaft.

12. The guided vehicle according to claim 11, wherein the endless chain comprises a pair of end regions with a plurality of links coupled to one another and a central region with a tensioning means.

13. The guided vehicle according to claim 10, further comprising an elastic return connected to the actuator rods and the frame.

14. The guided vehicle according to claim 13,
wherein the return comprises a plurality of helical springs located in end areas of each of the actuating rods,
wherein an upper end of a respective one of the plurality of helical springs abuts against a portion of a respective one of the actuator rods while a lower end of the respective one of the helical springs abuts against an abutment surface in a lower portion of the frame.

15. The guided vehicle according to claim 10, wherein the first plurality of wheels comprises wheels that are located in two movable housings arranged on opposite sides of the frame, the wheels being detachably mounted on fixed shafts, wherein ends of the actuator rods are solidly connected to a respective one of the two movable housings in such a way that the actuator rods and the housings are moveable together.

16. The guided vehicle according to claim 15, further comprising a guide for movement of the housings in upwards and downwards directions.

17. The guided vehicle according to claim 16, wherein the guide comprises linear grooves in vertical walls of the frame facing one another on which a corresponding one of the rails is slideable.

18. The guided vehicle according to claim 10, further comprising a retractable guide linked to the first plurality of wheels.

* * * * *